(12) United States Patent
Welschinger et al.

(10) Patent No.: US 10,001,132 B2
(45) Date of Patent: Jun. 19, 2018

(54) AXIALLY SPLIT PUMP

(71) Applicant: Sulzer Management AG, Winterthur (CH)

(72) Inventors: Thomas Welschinger, Radolfzell (DE); Heike Tischler, Winterthur (CH); Berthold Vogel, Schwieberdingen (DE)

(73) Assignee: SULZER MANAGEMENT AG, Winterthur (CH)

( * ) Notice: Subject to any disclaimer, the term of this patent is extended or adjusted under 35 U.S.C. 154(b) by 220 days.

(21) Appl. No.: 14/945,477

(22) Filed: Nov. 19, 2015

(65) Prior Publication Data

US 2016/0160870 A1 Jun. 9, 2016

(30) Foreign Application Priority Data

Dec. 5, 2014 (EP) .................................... 14196441

(51) Int. Cl.
*F04D 29/08* (2006.01)
*F04D 1/06* (2006.01)
(Continued)

(52) U.S. Cl.
CPC .............. *F04D 29/086* (2013.01); *F04D 1/06* (2013.01); *F04D 17/08* (2013.01); *F04D 29/083* (2013.01);
(Continued)

(58) Field of Classification Search
CPC F16J 15/061; F16J 15/06; F16J 15/021; F16J 15/02; F04D 29/086; F04D 29/08;
(Continued)

(56) References Cited

U.S. PATENT DOCUMENTS

2015/0300365 A1* 10/2015 Montemayor ......... F16J 15/062
415/214.1

FOREIGN PATENT DOCUMENTS

EP 2636905 A1 9/2013
JP 6224079 Y2 6/1987
(Continued)

OTHER PUBLICATIONS

Extended European Search Report dated Jun. 10, 2015 in European Patent Application No. 14196441.1, Filed Dec. 5, 2014.

*Primary Examiner* — Dwayne J White
*Assistant Examiner* — Justin A Pruitt
(74) *Attorney, Agent, or Firm* — Global IP Counselors, LLP

(57) ABSTRACT

An axially split pump for conveying a fluid has an axially split housing that includes a bottom part and a cover. The bottom part has a first sealing surface and the cover has a second sealing surface, the bottom part and the cover being fastened so that the two sealing surfaces have direct contact. A first sealing groove for the reception of a first string-like sealing element is in the sealing surfaces, and a second sealing groove is provided for the reception of a second string-like element, the second sealing groove being connected to the first sealing groove via an opening. A connection element is in the opening that has two lateral cut-outs respectively for the reception of a one of the string-like sealing elements. The cut-outs are arranged and configured so that the two string-like sealing elements run substantially in parallel in the region of the connection element.

19 Claims, 7 Drawing Sheets

(51) Int. Cl.
*F04D 29/42* (2006.01)
*F04D 29/62* (2006.01)
*F04D 29/22* (2006.01)
*F04D 29/28* (2006.01)
*F16J 15/06* (2006.01)
*F04D 17/08* (2006.01)

(52) U.S. Cl.
CPC .............. *F04D 29/22* (2013.01); *F04D 29/28* (2013.01); *F04D 29/4206* (2013.01); *F04D 29/426* (2013.01); *F04D 29/624* (2013.01); *F04D 29/628* (2013.01); *F16J 15/06* (2013.01)

(58) Field of Classification Search
CPC ...... F04D 29/083; F04D 29/16; F04D 29/161; F04D 29/162; F04D 29/164; F04D 29/165; F04D 29/167; F04D 29/168
USPC .......................... 277/628, 641, 642, 643, 637
See application file for complete search history.

(56) References Cited

FOREIGN PATENT DOCUMENTS

| | | |
|---|---|---|
| JP | 6375665 U | 5/1988 |
| WO | 2014083374 A1 | 6/2014 |
| WO | 2014095787 A1 | 6/2014 |

\* cited by examiner

AXIALLY SPLIT PUMP

CROSS-REFERENCE TO RELATED APPLICATIONS

This application claims priority to EP Application No. 14196441.1, filed Dec. 5, 2014, the contents of which is hereby incorporated here-in by reference.

BACKGROUND

Field of Invention

The invention relates to an axially split pump for conveying a fluid.

Background Information

Axially split pumps, which are also referred to as horizontally divided pumps, are pumps in which the housing is divided in parallel with the axis of the shaft and that has a bottom part and a cover. Both the bottom part, as well as the cover each have a flange which are placed on top of one another for a mounting of the pump and are then fixedly connected to one another, for example are screwed to one another.

Axially split pumps have been known for a long time and are produced in a variety of embodiments, typically as centrifugal pumps, for example as single flow or dual flow pumps and as single stage or multi-stage pumps. In this connection the impeller of the pump can be arranged between two bearings (between bearing pump). Also the field of application of these pumps is very wide, for example, they are used in the oil and gas industry or in the water industry or in the field of generation of energy. Frequently axially split pumps are configured for a high operating pressure or for large volume flows and are suitable for pumping over large geodetic heights, for the conveyance through water pipelines or oil pipelines or for the desalination of sea water by means of reverse osmosis.

Naturally, the seal between the bottom part and the cover of the housing along the two flanges is of great importance having regard to axially split pumps. In this connection the purpose is, on the one hand, to seal the inner space of the pump with respect to the environment and, on the other hand, to seal such pressure spaces in the internal space of the pump with respect to one another in which different pressures are present during the operating state such as is, for example, the case for multi-stage pumps.

For sealing between the bottom part and the cover it is known to insert a flat seal between the two flanges, in particular for applications with high pressure, such that the two flanges do not directly contact one another in the mounted state, but rather contact the flat seal at both sides. Such flat seals require a high pre-load, in particular also in order to achieve the required aerial pressing between the bottom part, the cover and the flat seal.

An alternative technology for sealing between the bottom part and the cover, as is, for example, also described in the WO-A-2014/083374, consists therein of mounting the flanges of the bottom part and the upper part directly on top of one another without a seal lying there between. The respective surfaces of the two flanges then form sealing surfaces that, in the mounted state, have direct contact with one another. Having regard to this solution an outer sealing groove is typically provided in the bottom part or in the cover or in the bottom part and in the cover, the outer sealing groove extending over the complete axial length of the pump and into which a string-like sealing element, for example, an O-ring-like sealing element is inserted. After insertion of the string-like sealing element into the sealing groove, the bottom part and the cover are fixedly screwed to one another such that the sealing surfaces of the two flanges are in direct contact with one another and the string-like sealing element is elastically deformed in the sealing groove in order to thus ensure a reliable seal.

SUMMARY

As no flat seal is inserted between the flange of the bottom part and that of the cover having regard to this solution, the screwed connections, by means of which the bottom part and the cover are fastened to one another, have to bear a significantly reduced load. From this a few advantages results: for example, the flanges which form the sealing surfaces can be configured considerably thinner and narrower, less material is required for the flanges which brings about a cost and weight saving; smaller screws and/or bolts can be used for the screwing together of the bottom part and the cover, for this reason the screws and/or bolts can also be placed closer to the hydraulic contour. Moreover, the use of the string-like sealing element permits a larger deformation of the housing in comparison to the use of flat seals. This is in particular of advantage having regard to multi-stage pumps, as the leakage between different pressure spaces in the pump in which different pressures are present can be significantly reduced or can even be avoided.

The string-like sealing elements are typically manufactured from an elastomer, such as are also used for common O-ring seals, for example from a nitrile rubber or a nitrile butadiene rubber (NBR).

Having regard to most applications more than one sealing groove is provided, with each sealing groove having an inserted string-like sealing element. Thus, for example, an inner string-like sealing element can be provided for the seal of the suction space with regard to the pressure space and an outer string-like sealing element can be provided which seals the inner space of the pump with respect to the outside world, this means with regard to the environmental pressure. In particular having regard to multi-stage pumps additional sealing grooves can be provided with a respectively inserted string-like element in order to bound the different pressure spaces in which different pressures are present in the operating state with respect to one another.

Having regard to the design of such seals by means of string-like sealing elements one strives to design the individual string-like sealing elements, if possible, as closed, this means in particular as ring-like sealing elements, as the connection or contact points between individual string-like sealing elements can potentially lead to leaks, in particular then when the pump is designed for a high operating pressure of, for example up to 100 bar. However, from a pure construction point of view it is not possible to exclusively make provision for sealing strings closed with respect to themselves. Critical points will always exist at which two individual sealing elements have to bound one another and which have to cooperate with one another for the desired seal.

Thus, for example, having regard to a multi-stage pump an inner string-like sealing element that serves for the seal between the two stages, has to be connected to the sealing element inserted into the outer sealing groove. This connection must be reliable and in the case of maintenance work has to be repairable without a large demand in effort and cost or specialist tooling.

In a schematic illustration such a critical point is exemplified in FIG. 1 at which point the two string-like sealing elements 101 and 103 contact one another at a T-shaped connection point. The string-like sealing elements 101, 103 typically have a round, in particular, a circular cross-section perpendicular to their longitudinal extent. The planar—this means non-curved—end surface 102 of the sealing element 101 contacts the curved jacket surface 104 of the other sealing element 103 at a T-shaped connection point. Hereby substantially triangular regions 105 are formed in which the two sealing elements 101 and 103 no longer have a contact. These regions 105 can lead to leaks which negatively influence the effect of the sealing arrangement.

Starting from the described state of the art it is thus an object of the invention to suggest an axially split pump for conveying a fluid in which a seal is ensured also at connection points between sealing elements.

The subject matter of the invention satisfies this object. In accordance with the invention, an axially split pump for conveying a fluid is thus suggested, having an axially split housing that comprises a bottom part and a cover; wherein the bottom part has a first sealing surface and the cover has a second sealing surface, wherein the bottom part and the cover can be fastened to one another in such a way that the two sealing surfaces have direct contact with one another, wherein a first sealing groove for the reception of a first string-like sealing element is provided in the sealing surfaces, and a second sealing groove is provided for the reception of a second string-like sealing element, the second sealing groove being connected to the first sealing groove by an opening, and wherein a connection element is provided in the opening, the connection element having two lateral cut-outs respectively for the reception of one of the string-like sealing elements, wherein the cut-outs are arranged and configured in such a way that the two string-like sealing elements can run substantially in parallel in the region of the connection element.

In this connection a first string-like sealing element is preferably inserted into the first sealing groove and a second string-like sealing element is inserted into the second sealing groove and each of the two lateral cut-outs of the connection element respectively receives one of the string-like sealing elements.

The invention is based on the recognition explained with reference to FIG. 1 that problems can arise in particular at such contact points between two separate sealing elements, at which a planar—this means non-curved—end surface of the one sealing element contacts a curved surface, for example the jacket surface, of a second sealing element circular in cross-section. This geometry brings about a reduced contact surface between the two sealing elements such that leaks can arise here in a simplified manner.

Due to the fact that the connection element with the two lateral cut-outs is provided in the opening in accordance with the invention, the two string-like sealing elements can be arranged in parallel with one another and in this way have a significantly increased effective contact area over the connection element which leads to a considerably improved sealing effect at this connection point. It can thus in particular also be avoided that a planar end surface of one of the sealing elements contacts the curved surface of a different sealing element at an actually T-shaped connection point.

Through the design in accordance with the invention the cooperation of the sealing elements can be significantly improved such that a very reliable seal is ensured between the individual regions of the pump also in particular at very high operating pressures.

In accordance with a preferred embodiment one of the two cut-outs receives a straight end of one of the string-like sealing elements. This arrangement can replace the T-shaped connection point between two string-like sealing elements. While the first sealing element is inserted into one of the two cut-outs of the connection element and is continuous, the end of the second sealing element running perpendicular thereto is guided in the other cut-out of the connection element and extends there in parallel with the first sealing element.

A particularly advantageous measure consists therein that each of the cut-outs has an inner contour which respectively follows the jacket surface of the respective string-like sealing element. Through this measure each sealing element can respectively ideally nestle to the inner contour of the cut-out, from which an as large as possible contact surface and in this way a particularly good sealing effect results.

In practice it has been found to be advantageous, when the cut-outs in the connection element respectively have a length that is at least as large as the three-fold diameter of the inserted sealing element.

In accordance with a preferred embodiment each sealing groove is provided in the bottom part of the housing which in particular enables a more simple manufacture and a more simple mounting.

Preferably, the connection element is produced from a plastic, for example as an injection-molded part.

In accordance with a preferred embodiment the first sealing groove is arranged for sealing the inner space of the pump with regard to the environmental pressure. As this sealing groove can be designed continuous over the complete axial length of the pump—this means without interruptions—a particularly reliable seal with respect to the inner space of the pump and the environment can be realized in this way.

The second sealing groove is preferably arranged for a seal between two pressure spaces in the pump in which different pressures exist in the operating state.

A further advantageous measure consists therein that the opening has a cut-out that extends in parallel with the longitudinal extent of the connection element.

Optionally an elastic pre-loading element can then be inserted into this cut-out which exerts a radially outwardly directed pre-load onto the string-like sealing element. This measure provides the advantage that a very good sealing effect is achieved from the start, already at lower operating pressures, this thus means for example on a start of the pump. Furthermore, the advantage results that, following a longer operating duration of the pump, when degradations or other changes could arise in the string-like sealing element, the elastic preloading element compensates these changes and reliably presses the sealing element against the wall of the sealing groove.

Also during the mounting of the pump this measure is advantageous, as, for example, a free end of the string-like element is quasi clamped in the region of the opening and thus is held in the desired position.

Preferably the pre-loading element is spring elastic and extends in parallel with the string-like sealing element. Particularly preferably the preloading element is configured as a spring.

Having regard to the material it is preferred when the string-like sealing element is manufactured from an elastomer, in particular from a nitrile rubber, specifically from nitrile butadiene rubber (NBR).

The pump in accordance with the invention is in particular suitable also for very high operating pressures and can preferably be designed as a centrifugal pump having a design pressure of at least 50 bar, preferably of at least 100 bar.

In a preferred application the pump in accordance with the invention is configured as a multi-stage pump.

Further advantageous measures and designs of the invention result from the dependent claims.

BRIEF DESCRIPTION OF THE DRAWINGS

The invention will be explained in more detail hereinafter with reference to the drawings.

DETAILED DESCRIPTION OF THE EMBODIMENTS

Figure 2:
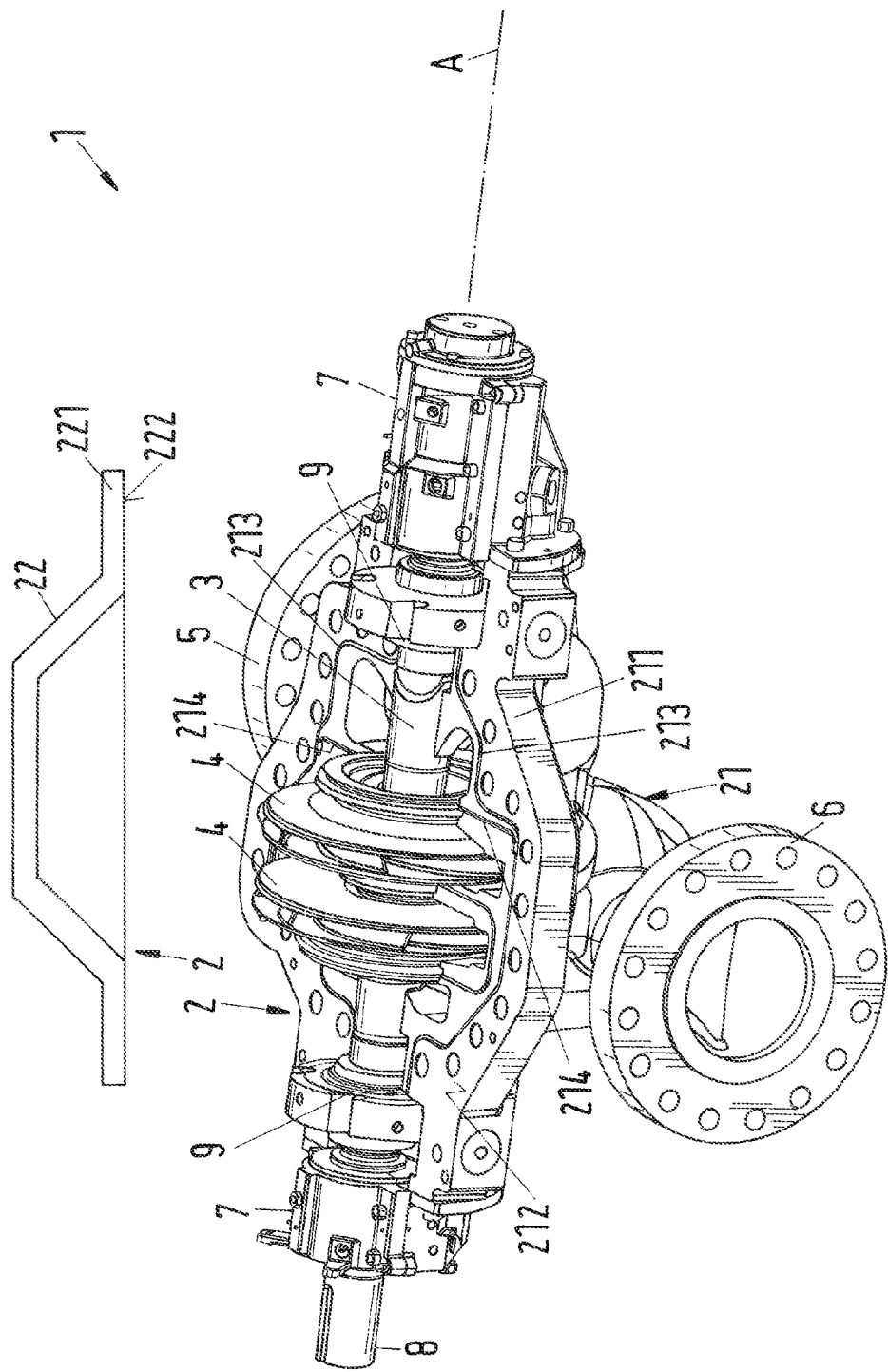
FIG. 2 is a perspective illustration of an embodiment of a pump in accordance with the invention, wherein the cover is removed and is only symbolically indicated.
Figure 3:
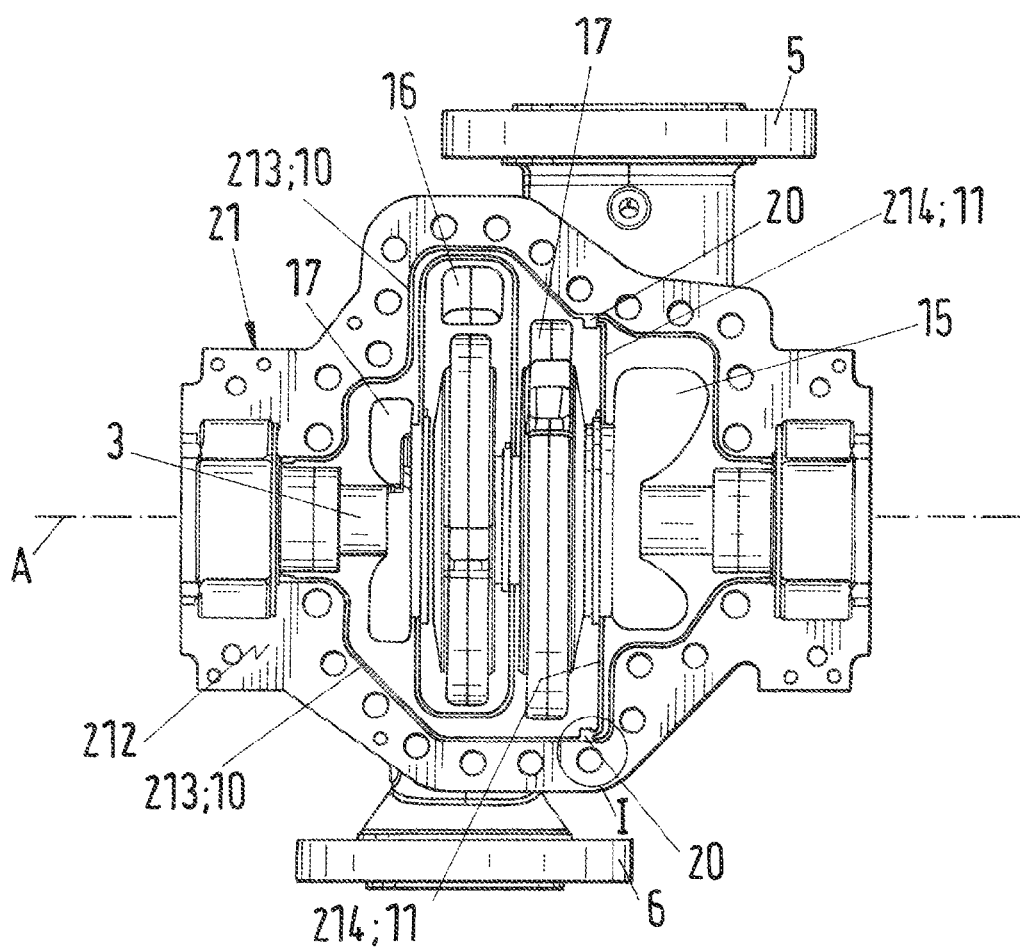
FIG. 3 is a top view onto the bottom part of the housing of the embodiment of FIG. 2.

FIG. 2 in a perspective illustration shows an embodiment of an axially split pump in accordance with the invention which is referred to in totality by means of the reference numeral 1. The pump 1 comprises a housing 2 that is axially split and that has a bottom part 21 as well as a cover 22. For a better understanding the cover 22 is removed in FIG. 2 and is only symbolically indicated. FIG. 3 shows a top view onto the bottom part 21 of the housing 2 of this embodiment.

Figure 1:
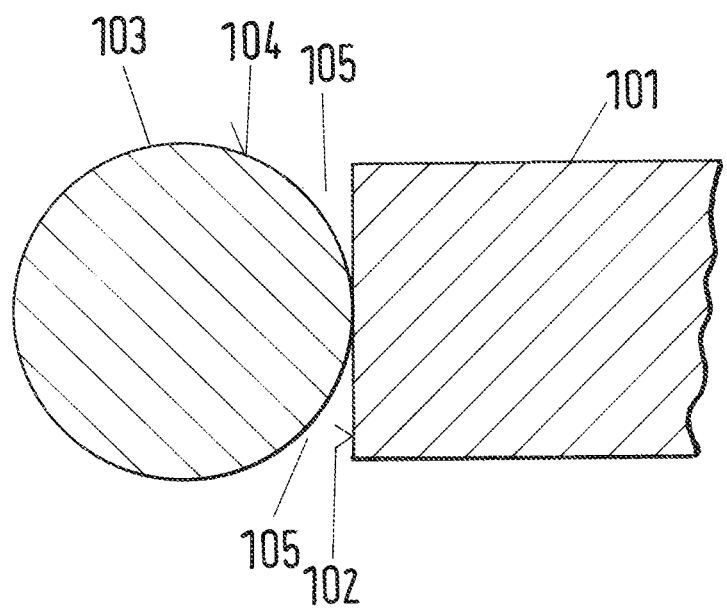
FIG. 1 is a schematic illustration of a T-shaped contact point between two sealing elements.

The housing 2 comprise an inlet 5 for sucking in a fluid to be conveyed, as well as an outlet 6 for the fluid. The pump 1 further comprises a rotatable shaft 3 whose longitudinal direction determines an axial direction A. At least one impeller 4 is rotatably fixedly mounted at the shaft 3, in the present case two impellers 4 are mounted which convey the fluid from the inlet 5 to the outlet 6. Furthermore, a respective bearing apparatus 7 is provided at both ends with respect to the axial direction A of the pump 1 in order to support the shaft 3 of the pump 1. The left hand bearing apparatus 7 in accordance with the illustration (FIG. 1) is furthermore provided with a clutch 8 that can be connected to a non-illustrated drive by means of which the shaft 3 of the pump 1 is displaced into rotation.

The term axially split pump 1 and/or axially split housing 2 is meant as generally used in such a way that the housing 2 is divided in parallel with the longitudinal direction of the shaft 3, this thus means in a plane which includes the longitudinal axis of the shaft 3.

In particular the pump 1 illustrated in FIGS. 2 and 3 is an axially split multi-stage centrifugal pump—in this example a two-stage centrifugal pump that is of single flow design and is in a so-called between-bearing-arrangement, this means the impellers 4 are present between the bearing apparatuses 7. It is understood that the invention is not limited to such pump types, but rather is also suitable for other pumps with an axially split housing 1, for example single stage pumps, this means such pumps having only one impeller 4, dual-flow pumps having a single stage or multi-stage design or different pump types in comparison to centrifugal pumps.

Having regard to the axial direction A the housing 2 of the pump 1 is respectively closed by a side cover 9 which in the present case simultaneously forms the closure cover of the mechanical shaft seal.

The cover 22 and the bottom part 21 of the housing 2 are in direct contact with one another in the mounted state, this means that no flat seal is provided between these two parts, which flat seal would prevent the direct contact between the bottom part 21 and the cover 22. For this purpose the bottom part 21 comprises a first flange 211 which in the mounted state extends in the plane of the axial division of the housing 2 and its upper surface in accordance with the illustration forms a first sealing surface 212. In an analog-like manner the cover 22 is provided with a second flange 221 that extends, in the mounted state, in the plane of the axial division of the housing 2 and its lower surface in accordance with the illustration (FIG. 2) forms a second sealing surface 222.

Following the mounting of the cover 22 onto the bottom part 21, the first sealing surface 212 and the second sealing surface 222 are in direct contact with one another in order to form a sealing connection between the bottom part 21 and the cover 22 of the housing 2. A first sealing groove 213 is provided in the first sealing surface 212 of the bottom part 21, the first sealing groove extending from the left hand side cover 9 in accordance with the illustration in the axial direction A following the inner contour of the pump 1 up to the other side cover 9. This first sealing groove 213 is provided at both sides of the shaft 3. A first string-like sealing element 10 is inserted into the sealing groove 213 which extends over the total length of the first sealing groove 213 and which seals the inner space of the pump 1 with respect to the environment. For this reason the first sealing groove 213 is also referred to as an outer sealing groove 213. The first string-like sealing element 10 typically has a round cross-section, such as is, for example, known from common O-rings. Naturally it is also possible that the string-like sealing element has a different cross-section, for example, a rectangular and in particular a quadratic cross-section. In this connection the first string-like sealing element 10 is dimensioned in such a way with respect to its diameter that it projects beyond the boundary of the first sealing groove 213 in the un-mounted state. During the mounting of the cover 22 on the bottom part 21, the string-like sealing element 10 is thus elastically deformed and in this way ensures a reliable seal between the bottom part 21 and the cover 22 of the housing 2.

The fastening of the cover 22 onto the bottom part 21 preferably takes place by means of bolts or screws which engage through bores or threaded bores (without reference numerals in FIGS. 2 and 3) provided in the first sealing surface 212 in such a way that the bottom part 21 and the cover 22 are fixedly and sealingly screwed to one another.

In the present embodiment the pump 1 is configured as a two-stage centrifugal pump. Thus, a plurality of pressure spaces exist in the interior of the pump 1 in which different pressures exist in the operating state (see FIG. 3): In a suction space 15 of the pump 1 the suction pressure is present that is present at the inlet 5 of the pump 1; the conveying pressure is present in an outlet space 16 by means of which the fluid is made available at the outlet 6 of the pump. An intermediate pressure is present in an intermediate space 17 the magnitude of which lies between the suction pressure and the conveying pressure. Having regard to the two-stage pump 1 the fluid to be conveyed is conveyed coming from the inlet 5 by means of the right hand impeller 4 in accordance with the invention of a first stage into the intermediate space 17 and in this connection is brought to the intermediate pressure. From the intermediate space 17 the left hand impeller 4 of the second stage in accordance with the illustration conveys the fluid into the outlet space 16 where it is then present at the conveying pressure and is made available at the outlet 6 of the pump 1.

Further sealing grooves are provided for the seal between the different pressure spaces in the pump 1. At least one second sealing groove 214 is provided in the bottom part 21 which is also referred to as an inner sealing groove 214 as it serves for the seal between different pressure spaces in the pump, in the present embodiment the second sealing groove 214 serves for the seal between the suction space 15 and the intermediate space 17. As is in particular shown in FIG. 3 the second sealing groove 214 is likewise provided at both sides of the shaft 3. A second string-like sealing element 11 is inserted in the second sealing groove 214, the second string-like sealing element extending over the total length of the second sealing groove 214. Also the second string-like sealing element 11 typically has a round cross-section such as is, for example, known from customary O-rings. Naturally it is also possible that the second string-like sealing element has a different cross-section, for example, a rectangular cross-section and in particular a quadratic cross-section. In this connection the second string-like sealing element 11 is dimensioned with regard to its diameter in such a way that it projects beyond the boundary of the second sealing groove 214 in the unmounted state. During the mounting of the cover 22 onto the bottom part 21 the second string-like sealing element is elastically deformed in this way and in this way ensures a reliable seal between the suction space 15 and the intermediate space 17.

Alternatively it is also possible to provide the first and/or the second sealing groove 213 as well as further sealing grooves and/or in the cover 22 of the housing 2, or to provide it/them both in the bottom part 21 as well as in the cover 22. For reasons of manufacture and mounting it is preferred to provide all sealing grooves 213, 214 only in the bottom part 21.

As is shown in particular in FIG. 3, the second sealing groove 214 extends in a radial direction perpendicular to the axial direction. The second sealing groove 214 is connected to the first sealing groove 213 by an opening 20 such that the two sealing elements 10 and 11 can cooperate and/or be connected to one another. This will be explained in the following in detail. For this purpose FIG. 4 in an enlarged and schematic illustration of the detail I of FIG. 3 shows the region of the opening 20 of the second sealing groove 214 into the first sealing groove 213. For a better understanding the first and the second string-like sealing element 10 and/or 11 are respectively illustrated in a hatched manner in FIG. 4.

Figure 5:
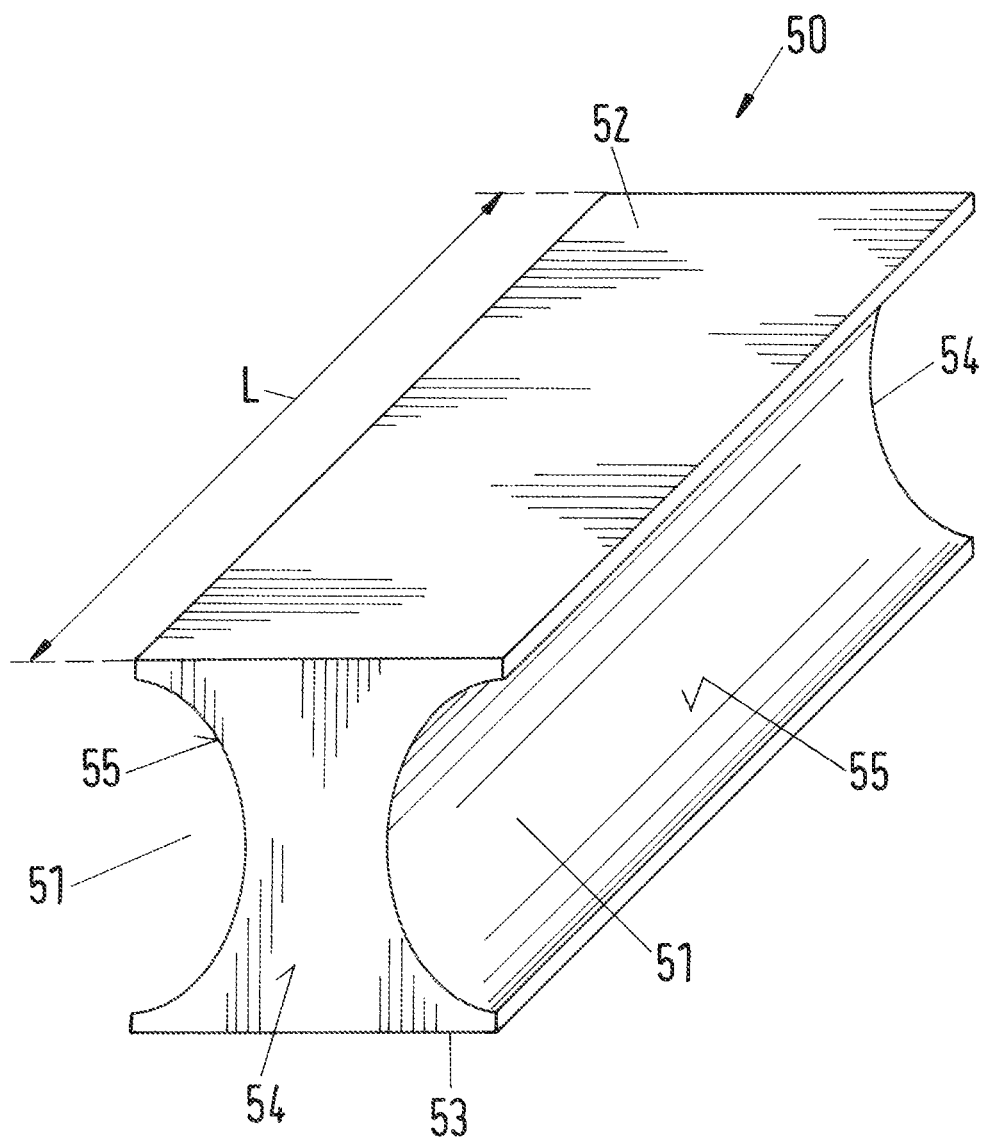
FIG. 5 is a perspective illustration of an embodiment of a connection element.
Figure 6:
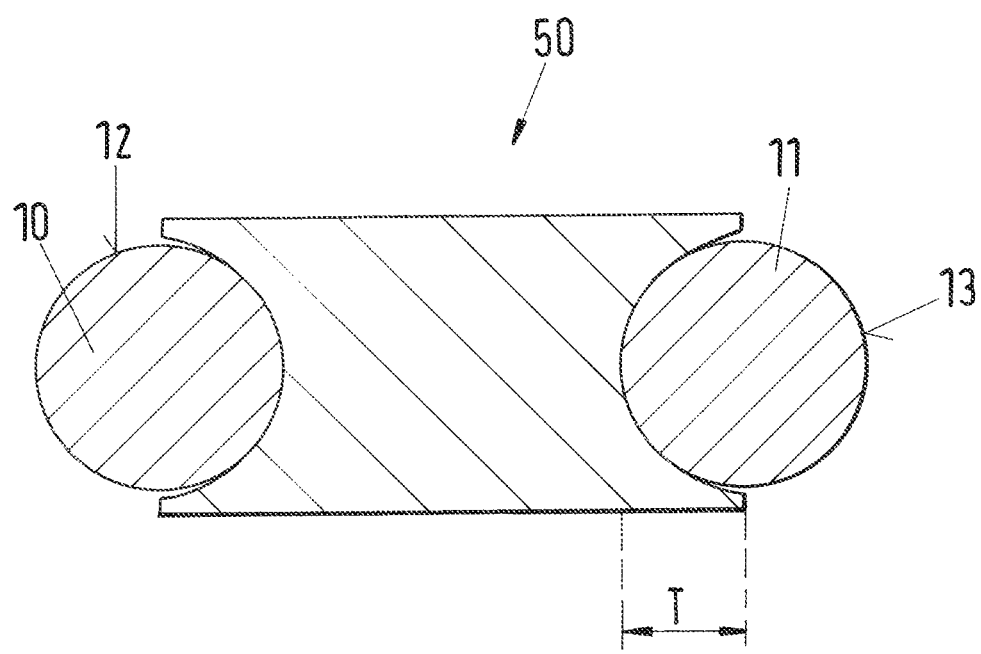
FIG. 6 is a cross-section through the connection element with inserted sealing elements.

In accordance with the invention a connection element 50 is provided in the opening 20. For a better understanding FIG. 5 shows a perspective illustration of an embodiment of the connection element 50 and FIG. 6 shows a cross-section through the connection element 50, wherein the two string-like sealing elements 10, 11 are inserted into the connection element 50 in FIG. 6.

The connection element 50 has a rectangular bottom side 53 and a rectangular upper side 52 extending in parallel thereto which sides are connected to one another by two end surfaces 54. Its longitudinal extent is referred to as length L.

The connection element 50 has two lateral cut-outs 51 that respectively extend over the total length L between the end surfaces 54.

The lateral cut-outs 51 are respectively configured for the reception of a respective one of the string-like sealing elements 10 and/or 11 and—depending on the sealing element—can be configured identical to or different from one another. The two lateral cut-outs 51 extend in parallel with one another such that the two string-like sealing elements 10 and/or 11 lie in parallel with one another after their insertion into the cut-outs 51 in the region of the connection piece 50 or lie at least substantially in parallel with one another.

Each of the cut-outs 51 has an inner contour 55 which respectively follows the jacket surface 12 and/or 13 of the respective string-like sealing element 10 and/or 11 which is inserted into the cut-out 51. If the sealing elements 10, 11 for example have a circular cross-sectional surface—as is illustrated in FIG. 6—then the inner contour 55 of the cut-out 51 is likewise curved circular arc-shaped perpendicular to the longitudinal extent of the cut-out 51, wherein the radius of curvature substantially corresponds to that of the respective sealing element 10, 11.

From this measure an as large as possible large area contact results between the respective sealing element 10, 11 and the connection piece 50.

The depth T of the cut-out 51 perpendicular to its longitudinal extent can be adapted depending on the case of application. Having regard to the sealing elements 10, 11 with circular cross-section it has, however, been found to be sufficient when the cut-out 51 contacts at most half, preferably less than half, of the jacket surface 12, 13 of the sealing element 10, 11 in practice. Depending on the case of application and the design of the respective sealing element the depth T can be different for the two cut-outs 51. Also the curvature of the inner contour 55 can be different for the two cut-outs 51. In the present embodiment the depth T and the curvature of the inner contour 55 is the same for the two cut-outs 51.

Figure 4:
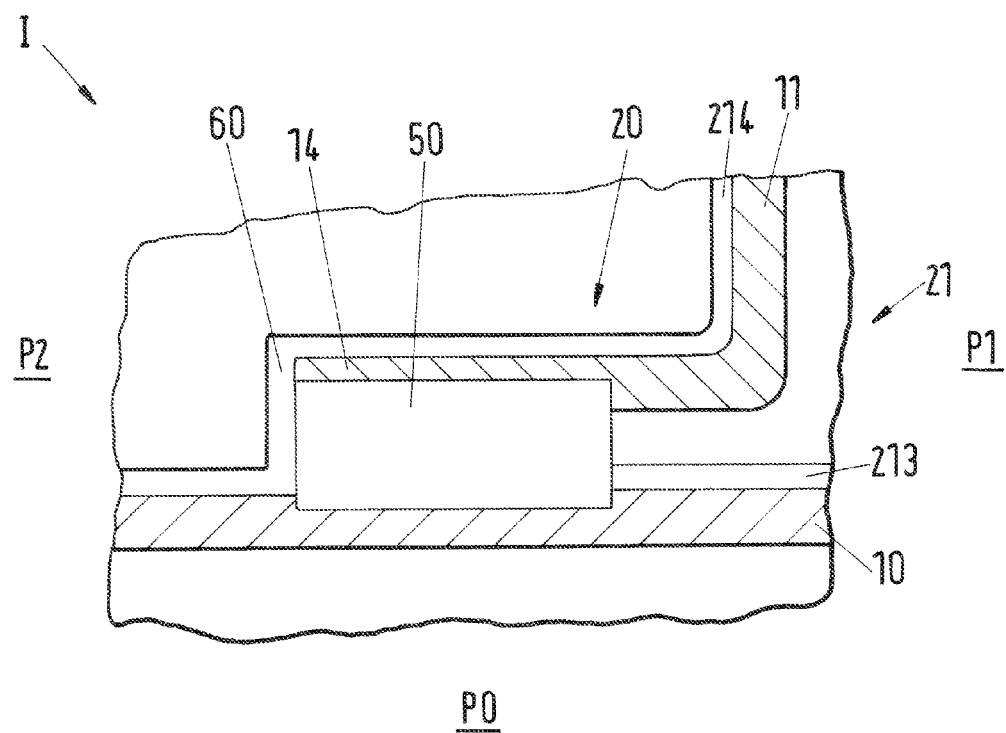
FIG. 4 is a schematic illustration of the detail I of FIG. 3.

As is shown in FIG. 4 an expansion 60 of the two sealing grooves 213, 214 is provided in the region of the opening 20 into which the connection element 50 can be inserted. The first string-like element 10 is continuous in the region of the connection element 50, this means it does not have to be cut apart or be manipulated in any other way, but is rather simply inserted into the corresponding cut-out 51.

The second string-like sealing element 11 has an end 14 in the region of the opening 20. This straight end 14 is inserted into the other one of the two cut-outs 51 and in this way extends in parallel with the first string-like sealing element 10 in the region of the connection element 50. The second sealing element 11 is dimensioned with regard to its length preferably in such a way that its end 14 terminates substantially flushly with the end surface 54 of the connection element 50 after the insertion into the cut-out 51. In this way an as large as possible large area sealing contact is ensured between the respective sealing element 10, 11 and the cut-out 51 receiving it.

The arrangement exemplified in particular in FIG. 4 enables the replacement of otherwise T-shaped connections or contact points between separate sealing elements 10, 11 by means of a particularly good sealing connection in which the two sealing elements 10, 11 are guided in parallel with one another in the region of the opening 20.

In the operating state a smaller pressure P1 is present at the right hand side of the second string-like sealing element 11 in accordance with the illustration than at the left hand side in accordance with the illustration, whereas when the pressure P2 is present. In accordance with the illustration outside of the housing 2 the environmental pressure and/or the atmospheric pressure P0 is then present beneath the first sealing element 10. On the one hand, the two sealing elements 10, 11 are pressed against the wall of the first and/or the second sealing groove 213, 214 in a sealing manner due to the pressure differences, on the other hand, the pressure difference presses the second sealing element 11 against the inner contour 55 of the cut-out 51 from which a force effect transmitted by means of the connection element 50 is also exerted onto the first sealing element 10 that is thereby pressed against the wall of the first sealing groove 213.

The suitable length L for the connection element 50 results depending on the case of application; however, it has been proven in practice when the cut-outs 51 each have a length L that is at least as large as three times the diameter of the inserted sealing element 10 and/or 11.

The connection element 50 is preferably manufactured from a plastic and can, for example, be an injection molded part. Whereas the shaping of the connection element 50 is primarily essential for an as good as possible contact with the respective sealing element 10 and/or 11 it can still, for example be advantageous when the connection element 50 is elastically deformable.

As a material for the first string-like sealing element 10 as well as for the second string-like sealing element 11 in particular all known materials are suitable that can be used for such seals, in particular elastomers such as nitrile rubber and specifically nitrile butadiene rubber (NBR).

Figure 7:
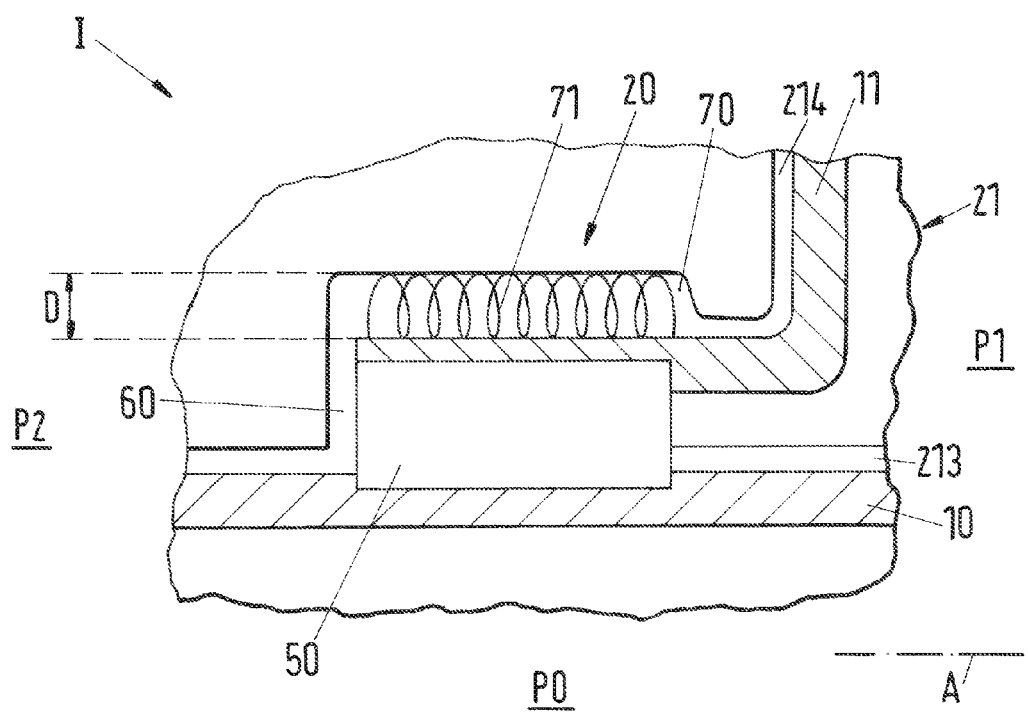
FIG. 7 is a variant for the embodiment of FIG. 2 in an illustration analog to that of FIG. 4.

FIG. 7 emphasizes a particularly preferred variant for the design of the pump 1 in accordance with the invention in analogy to FIG. 4. In the following, reference will only be made to the differences to the described embodiment. Otherwise, the previously made explanations are true in the same or analog-like way also for this variant. In particular the reference numerals for like parts or parts having a similar function have the same meaning.

Having regard to the variant illustrated in FIG. 7, the opening 20 additionally has a cut-out 70 that extends in parallel with the longitudinal extent and/or to the longitudinal expansion of the connection element 50. An elastic pre-loading element 71 is preferably inserted into the cut-out 70 which exerts a pre-load onto—in this case the second—string-like sealing element 11. This pre-load is transmitted via the connection element 50 also onto the other—in this case the first—sealing element 10. The arrangement of the pre-loading element 71 and/or of the cut-out 70 in this connection is selected in such a way that the pre-load is generated in the direction of the decreasing pressure, this means downwardly in the illustration in accordance with FIG. 7. Preferably the pre-loading element 71 is spring elastic and is in particular configured as a spring. The spring 71 extends in parallel with the second string-like sealing element 11 and is dimensioned in such a way that it is wider with regard to the radial direction and the width D of the cut-out 70.

The variant with the pre-loading element 71 provides several advantages. During the operation of the pump 1 the pre-loading element 71 ensures an additional contribution such that also for smaller operating pressures, this means for example when starting the pump 1, a sufficient sealing effect is immediately realized between the housing 2 of the pump 1 and the environment and/or between the suction space 15 and the intermediate space 17. Also with regard to the long term operation of the pump 1 the pre-loading element 71 is advantageous. If degradations, fatigue or other changes or wear appearances of the string-like sealing element 10 and/or 11 are namely brought about with an increasing operating duration of the pump 1 then these can be compensated through the effect of the pre-loading element 71 as this reliably presses the string-like sealing elements 10 and/or 11 against the connection element 50 and/or the wall of the sealing groove 214.

The improved sealing effect at the connection point between individual sealing elements 10, 11 is advantageous in particular also having regard to an as high as possible operating pressure of the pump 1. Thus, the pump 1 can be designed, for example in a variant as a centrifugal pump, having a design pressure of at least 50 bar and preferably at least 100 bar.

Also if the invention is only explained in detail with reference to a connection point between two separate sealing elements, it is naturally understood that the seal can be realized in the same or analog-like way at other or further connection or contact points between sealing elements. Naturally, the invention is also suitable for such multi-stage pumps which have more than two stages.

What is claimed is:

1. An axially split pump for conveying a fluid, comprising:
an axially split housing comprising a bottom part and a cover, the bottom part having a first sealing surface and the cover having a second sealing surface, the bottom part and the cover being configured to be fastened to one another so that the first and second sealing surfaces are in direct contact with one another, a first sealing groove configured to receive a first string-like sealing element and being disposed in at least one of the first and second sealing surfaces, and a second sealing groove being disposed to receive a second string-like sealing element, the second sealing groove being connected to the first sealing groove via an opening, a connection element being disposed in the opening, the connection element having two lateral cut-outs configured to receive a respective one of the first and second string-like sealing elements, the cut-outs being arranged and configured so that the first and second string-like sealing elements are capable of being run substantially in parallel in the region of the connection elements.

2. A pump in accordance with claim 1, wherein the first string-like sealing element is inserted into the first sealing groove and the second string-like sealing element is inserted into the second sealing groove and each of the two lateral cut-outs of the connection element respectively receives one of the first and second string-like sealing elements.

3. A pump in accordance with claim 1, wherein one of the two cut-outs receives a straight end of one of the first and second string-like sealing elements.

4. A pump in accordance with claim 1, wherein each of the cut-outs has an inner contour which respectively follows a jacket surface of the respective string-like sealing element.

5. A pump in accordance with claim 2, wherein the two lateral cut-outs respectively have a length in the connection element, the length being at least as large as three times the diameter of the inserted sealing element.

6. A pump in accordance with claim 1, in which each sealing groove is disposed in the bottom part of the housing.

7. A pump in accordance with any claim 1, wherein the connection element is manufactured from a plastic.

8. A pump in accordance with claim 1, wherein the first sealing groove is arranged to seal the inner space of the pump from environmental pressure.

9. A pump in accordance with claim 1, wherein the second sealing groove is arranged to seal between two pressure spaces in the pump, in the pressure spaces different pressures are present in an operating state.

10. A pump in accordance with claim 1, wherein the opening has a cut-out extending in parallel with a longitudinal extent of the connection element.

11. A pump in accordance with claim 10, wherein an elastic pre-load element is inserted into the cut-out, the elastic pre-loading element exerting a pre-load on one of the string-like sealing elements.

12. A pump in accordance with claim 11, wherein the preloading element is spring elastic and extends in parallel with one of the string-like sealing elements.

13. A pump in accordance with claim 1, wherein the first and second string-like sealing elements are elastomers.

14. A pump in accordance with claim 1 configured as a centrifugal pump having a design pressure of at least 50 bar.

15. A pump in accordance with claim 1 configured as a multi-stage pump.

16. A pump in accordance with claim 12, wherein the preloading element is a spring.

17. A pump in accordance with claim 1, wherein the first and second string-like sealing elements are nitrile rubber.

18. A pump in accordance with claim 1, wherein the first and second string-like sealing elements are nitrile butadiene rubber.

19. A pump in accordance with claim 1 configured as a centrifugal pump having a design pressure of at least 100 bar.

* * * * *